United States Patent [19]

Ruegg

[11] Patent Number: 5,386,939
[45] Date of Patent: Feb. 7, 1995

[54] APPARATUS AND METHOD FOR DISTRIBUTION OF SEASONINGS AND THE LIKE FOR THE UNIFORM DISTRIBUTION OF SEASONINGS OR LIKE GRANULAR/POWDERED MATERIALS

[75] Inventor: Richard J. Ruegg, Coppell, Tex.

[73] Assignee: Recot, Inc., Plano, Tex.

[21] Appl. No.: 707,822

[22] Filed: May 30, 1991

[51] Int. Cl.[6] .......................... A23P 1/08; B05C 19/00
[52] U.S. Cl. .......................... 239/7; 239/679;
   239/689; 222/412; 118/19; 118/24; 99/494
[58] Field of Search ............... 239/650, 668, 672, 675,
   239/679, 683, 689, 680; 222/412–414, 235, 236,
   238; 99/494; 118/19, 24

[56] References Cited

U.S. PATENT DOCUMENTS

| Re. 30,967 | 6/1982 | Ferrara et al. | 222/58 |
|---|---|---|---|
| 874,570 | 12/1907 | Cairncross | 118/24 |
| 978,615 | 12/1910 | Miller | 239/668 |
| 1,514,186 | 11/1924 | Van Houten | 239/668 |
| 1,753,811 | 4/1930 | Stolle | 239/668 |
| 2,144,142 | 1/1939 | Buehler | 239/668 |
| 2,498,833 | 2/1950 | Weyer | 239/668 |
| 2,907,500 | 10/1959 | Kerkvliet | 222/311 |
| 3,073,607 | 1/1963 | Christy | 239/668 |
| 3,147,144 | 9/1964 | Wilhelm | 118/420 |
| 3,155,288 | 11/1964 | Landgraf | 222/227 |
| 3,186,602 | 6/1965 | Ricciardi | 222/161 |
| 3,283,740 | 11/1966 | Fredricksen | 118/24 |
| 3,310,205 | 3/1967 | Meyer | 222/193 |
| 3,415,424 | 12/1968 | Crossley | 222/311 |
| 3,756,509 | 9/1973 | Hamnes | 239/675 |
| 3,890,923 | 6/1975 | Dumoulin | 118/19 |
| 3,967,758 | 7/1976 | Ferrara | 222/58 |
| 4,054,784 | 10/1977 | Ricciardi et al. | 364/479 |
| 4,111,272 | 9/1978 | Ricciardi et al. | 177/50 |
| 4,210,963 | 7/1980 | Ricciardi et al. | 364/567 |
| 4,301,510 | 11/1981 | Ricciardi et al. | 364/567 |
| 4,320,855 | 3/1982 | Ricciardi et al. | 222/56 |
| 4,419,953 | 12/1983 | Fowler | 118/16 |
| 4,493,442 | 1/1985 | Hanson, Jr. | 222/241 |
| 4,543,907 | 10/1985 | Fowler | 118/19 |
| 4,614,162 | 9/1986 | Ryan et al. | 118/19 |

FOREIGN PATENT DOCUMENTS

| 7663 | of 1913 | United Kingdom | 239/668 |

Primary Examiner—Karen B. Merritt
Attorney, Agent, or Firm—Rothwell, Figg, Ernst & Kurz

[57] ABSTRACT

An apparatus and method for uniformly distributing metered seasoning and/or granular/powdered material from an elongated opening in a seasoning snout includes a rotatable cylindrical spinner bar supported below the seasoning snout and driven at a surface speed greater than the falling speed of the seasoning from the metering openings so that seasoning falling from the metering openings hits the cylindrical bar and is sheared and directed generally tangentially to create a uniform curtain of seasoning materials while preventing the build up of seasoning material on the cylindrical spinner bar.

10 Claims, 2 Drawing Sheets

5,386,939

APPARATUS AND METHOD FOR DISTRIBUTION OF SEASONINGS AND THE LIKE FOR THE UNIFORM DISTRIBUTION OF SEASONINGS OR LIKE GRANULAR/POWDERED MATERIALS

BACKGROUND OF THE INVENTION

1. Field of the Invention

This invention relates to improvements in an apparatus for and method of a uniform and regular distribution of seasonings such as seasonings placed on potato chips, tortilla chips, corn chips and like snack foods, or of similar granular/powdered materials which are required to be evenly distributed.

2. Prior Art

Snack foods, particularly savory snacks, are extremely popular with consumers. Such snack foods include but are not limited to, potato chips, tortilla chips, corn chips, and the like. Such snack foods are typically seasoned by sprinkling of seasonings of one form or the other on the surface of the individual snack items. Examples include potato chips seasoned with salt, barbecue flavoring, sour cream and onion flavoring, vinegar flavoring, etc. Similarly, corn chips and other snack foods are seasoned with various flavorings. The distribution of seasoning is accomplished by sprinkling seasoning on the surface of the products after the products have been cooked and prior to their packaging. The application and distribution of such seasoning greatly affects the product quality. That is, if seasoning is distributed in clumps some chips are too strongly seasoned and other portions of the same batch of chips will be too lightly seasoned, thus creating a poor quality product. Also quite importantly, the distribution of seasoning greatly affects the economy of manufacturing. There is a continuing desire to economically measure and then to uniformly and evenly distribute the seasoning over the snack food during the manufacturing process.

Almost all seasonings vary in their flow properties. The metering of seasonings is important to ensure that only the proper amounts are applied and the distribution of the seasonings is important to ensure that the seasonings are evenly distributed over the product. Common seasonings in favor with consumers of snack food products, for example, barbecue, sour cream and onion, cheese, are sticky, lumpy, and very difficult to dispense. Not only the above-mentioned seasonings, but all seasonings present some difficult problems in metering and distribution.

U.S. Pat. No. 4,614,162 is directed to the problem of accurately metering and uniformly distributing seasonings through a seasoning tube (sometimes called a seasoning snout) which extends into a seasoning drum and is fed from a hopper through an auger. Acrison, Inc. of Moonhatchey, N.J. supplies commercially available equipment in which a motor-driven auger extends through the side of a hopper and through a short measuring tube to meter seasoning or other granular/powdered material.

While the prior art, especially as embodied in U.S. Pat. No. 4,614,162, works adequately, there is a continuing need to improve the seasoning coverage and distribution on the snack food chips.

Previous attempts to improve seasoning distribution using an elongated fluted bar beneath the seasoning snout to disperse the falling seasoning were not completely successful due to seasoning sticking to the fluted bar and not being uniformly distributed.

SUMMARY OF THE INVENTION

This invention relates to improvements in an apparatus for distributing seasoning which includes a hopper, metering tube, and auger, with apertures at the end of the metering tube, for example, as described in U.S. Pat. No. 4,614,162, or with a dispensing slot in the tube as disclosed in U.S. Pat. No. 5,090,593, but with improvements for more uniformly distributing the metered seasoning by means of a cylindrical spinner bar positioned below the exit openings of the metering tube so as to intercept the fall of the seasonings, the spinner bar being rotated at a speed to disperse the seasoning granules and powder with sufficient force to direct the powder into a randomly tumbling chip bed to improve seasoning coverage.

DETAILED DESCRIPTION OF THE PREFERRED EMBODIMENT

Figure 1:
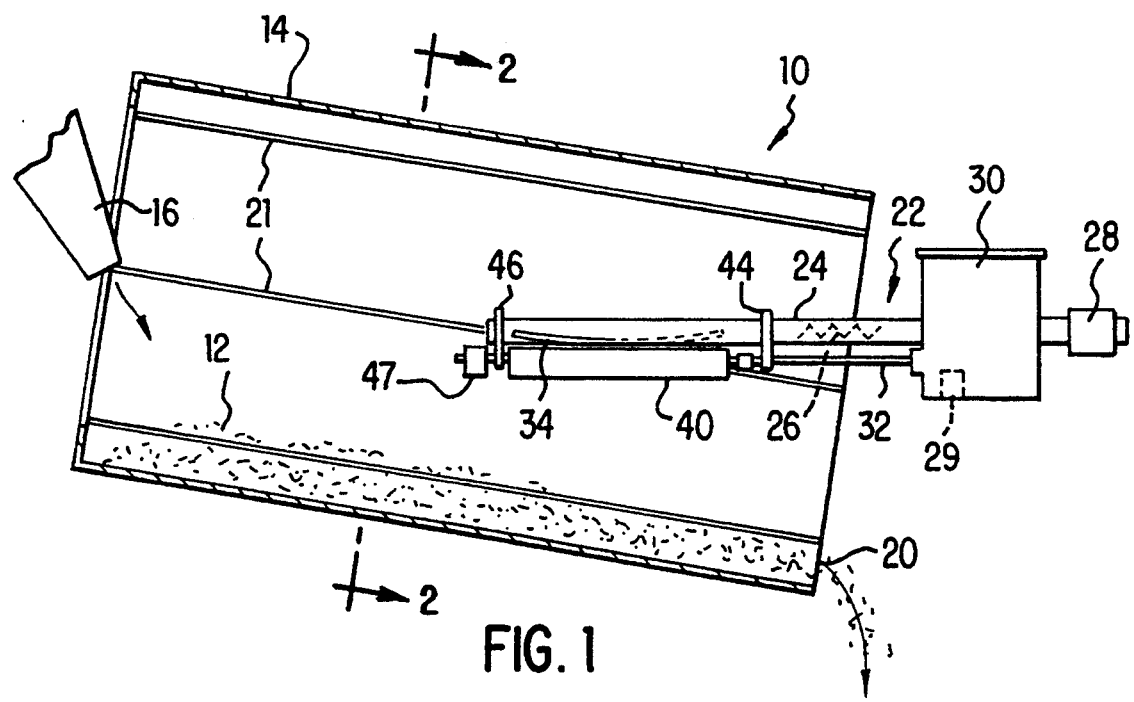
FIG. 1 is a schematic sectional view of a seasoning distribution system containing the improvement of this invention.
Figure 2:
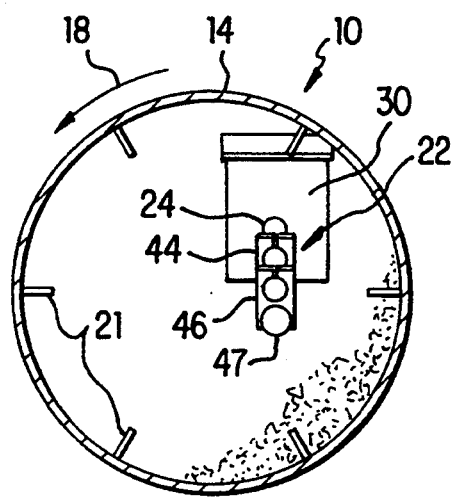
FIG. 2 is a schematic section elevation view taken along line 2—2 of FIG. 1.

By way of background and in order to explain the particular application of this invention, a seasoning apparatus 10 is shown in general in FIGS. 1 and 2. Unseasoned snack food 12 enters a cylindrical seasoning drum 14 at one end through a funnel 16. Such snack food may, for example, be potato chips, corn chips or the like, which have been cooked but not yet seasoned. Drum 14 is tilted at an inclined angle and is axially rotated in a direction of arrow 18 at a relatively low speed of rotation. The combination of tilt and rotation causes the snack food to travel continuously down the drum toward exit 20. Baffles 21 may be positioned radially on the internal surface of the drum to aid in mixing the snack food. A horizontal non-rotating seasoning dispenser 22 has a tube portion or snout 24 extending into the drum. Within the tube 24 is an auger 26 which is rotated by electric motor 28. Seasoning is fed to the distributing tube via a hopper 30 and is conveyed along the tube by auger 26 and dispensed from the tube through a series of apertures and falls downwardly by gravity, all as known in the prior art and as explained in prior U.S. Pat. No. 4,614,162. Alternatively and preferably, this invention is used with a seasoning snout as disclosed in U.S. Pat. No. 5,090,593 in which the seasoning snout has a slot-type opening 34 which extends from the side of the snout progressively downwardly toward the end of the snout.

Figure 4:
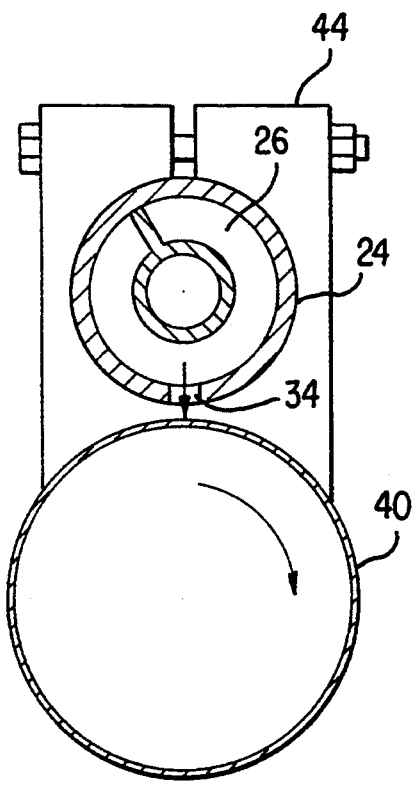
FIG. 4 is an end elevation view illustrating the action of the spinner bar on the metered seasoning.
Figure 3:
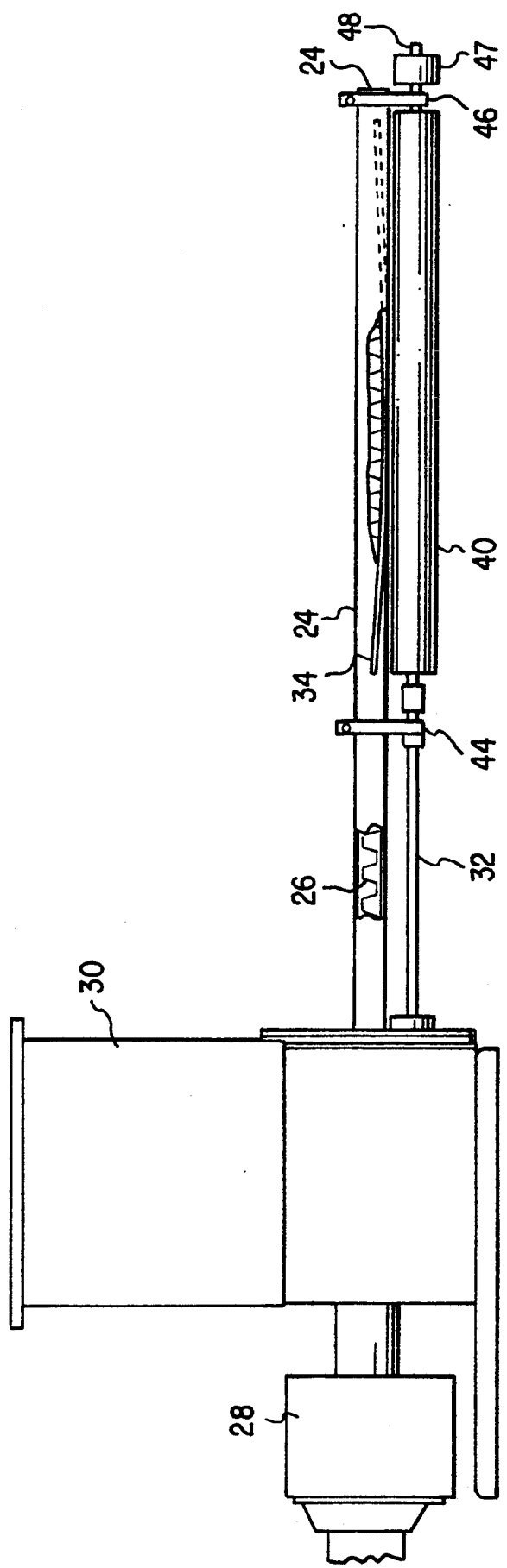
FIG. 3 is a side elevation view partially in section of the apparatus of this invention showing the spinner bar.

The present invention includes applying a cylindrical spinner bar 40 beneath the tube 24. The spinner bar 40 is in cross section and generally cylindrical in shape and is of such diameter to intercept seasoning falling from the snout 24. The spinner bar 40 is driven by a spinner drive shaft 32 indirectly from motor 29 (which is shown in phantom in FIG. 1) and is supported by bearings 44 and 46 at opposite ends thereof. The spinner bar 40 is positioned relative to the tube 24 as shown in FIG. 4 and the length of the spinner, as shown in FIG. 3, extends from a point inboard from the inboard end of the distribution slot to the end of the snout 24. The distribution slot 34 does not extend to the very end of the snout 24, thus bearing 46 does not interfere with the distribution of the seasonings by the spinner bar. There is also provided a spinner bar extension 47 mounted on the end of a spinner extension shaft 48 to accommodate seasoning which passes out the end of the snout 24.

As shown in FIG. 4, the seasoning powder drops from the distribution slot in the seasoning snout and impinges on the top of the round spinner bar, where there is both powder diversion and shear, thus uniformly dispersing the powder within the seasoning drum.

The round spinner has a diameter large enough to contact all seasoning powder being dropped from the snout and the speed of the bar is greater than the powder drop speed to effectively dispense the powder by shearing at its surface. Falling powder hits the spinning bar and is dispensed tangentially due to the shear forces producing a uniform curtain of seasoning. There is no seasoning buildup on the spinning bar.

The subject invention provides uniform seasoning dispersion, no seasoning buildup, and a simple but rugged design to accomplish the foregoing.

This eliminates the problem of using a fluted spinner, which under conditions of high heat and humidity causes the seasoning to stick to the fluted spinner and be irregularly dispensed to opposite sides of the seasoning tumbler and not to the chips, causing poor coverage on the seasoned chips.

It has been found that the round spinner bar driven at appropriate speeds greater than the gravitational drop speed induces shear in the falling seasoning powder curtain and disperses the powder in the horizontal plane. It also imparts sufficient force to the seasoning powder to direct this powder into the tumbling chip bed to improve seasoning coverage. Quite importantly, no seasoning builds up on the spinner bar.

As a non-limiting example, a three-inch round spinner bar located directly under a seasoner snout similar to that disclosed in U.S. application Ser. No. 07/510,769 filed Apr. 18, 1990 was driven at nominal speeds from 250 rpm to 500 rpm. Nacho cheese seasoning powder was distributed and released along the length of the seasoning snout. The seasoning powder dropped impinged on the cylindrical spinner bar and was dispersed tangentially due to the rotation of the bar. Substantially all the seasoning powder was directed to the chip bed to provide a uniform seasoning coverage. Spinner bar speeds above 500 rpm did not significantly increase seasoning dispersion but may limit bearing wear life.

As can be seen, this invention provides significant improvement in the uniform distribution of metered seasonings for snack foods and similar products. Not only is the seasoning more uniformly distributed, but the seasoning does not stick to the spinner distributor bar. This also significantly results in savings in the costs of the material as well as providing a higher quality product.

I claim:

1. An apparatus for uniformly metering and distributing food seasonings and like granular/powdered materials, the apparatus being of the type having a metering tube being fed with seasoning from one end and having an outlet at another end, a driven auger extending through the tube and opening means extending along a portion of the tube, with improvements comprising; a cylindrical spinner bar rotatably positioned beneath the metering tube in order to intercept and throw generally horizontally the falling seasoning materials, and means for rotatably driving the cylindrical spinner bar.

2. An apparatus as in claim 1 wherein the length of the cylindrical spinner bar extends at least the length of the opening means in the metering tube.

3. An apparatus as in claim 2 wherein the cylindrical bar and metering tube extend into a rotating drum for receiving articles to be seasoned.

4. An apparatus as in claim 2 further comprising a cylindrical extension at an end of the cylindrical spinner bar, the cylindrical extension positioned below the outlet of the metering tube.

5. An apparatus as in claim 4 wherein the means for rotatably driving the cylindrical spinner bar includes bearings supported from the metering tube.

6. An apparatus as in claim 4 wherein the cylindrical bar and metering tube extend into a rotating drum for receiving articles to be seasoned.

7. A method of uniformly distributing metered seasoning and like granular/powdered materials being dispensed from opening means in a metering tube, the method comprising positioning a cylindrical bar adjacent and below the opening means, contacting seasoning material falling from the opening means with the cylindrical bar, rotating the cylindrical bar at a surface speed faster than a drop speed of the seasoning material, so that a falling curtain of the seasoning material is sheared and directed by the force of the impact on the rotating bar in a generally horizontal direction to uniformly distribute the material.

8. A method as in claim 7 wherein the cylindrical bar and metering tube extend into a rotating drum for receiving articles to be seasoned.

9. An apparatus for uniformly dispensing powdered or granular food seasoning material, the apparatus comprising:
a metering tube having one end in communication with a supply of powdered or granular food seasoning material and having an outlet at the other end;
said metering tube having an open portion for dispensing the seasoning material supplied from said supply of powdered or granular seasoning material;
a cylindrical spinner bar positioned below said metering tube so that the seasoning material which is dispensed through said open portion falls onto the cylindrical surface of the spinner bar; and
means for rotating said cylindrical spinner bar so that the seasoning material dispensed through the open portion of said metering tube contacts the rotating surface of the spinner bar and is directed substantially horizontally away from the surface of said cylindrical spinner bar to provide uniform dispersion of the seasoning material.

10. An apparatus as claimed in claim 9 wherein said spinner bar has a cylindrical extension at an end thereof on which seasoning material that passes through the outlet of said metering tube falls.

* * * * *